United States Patent [19]

Schroeder

[11] Patent Number: 5,247,236
[45] Date of Patent: Sep. 21, 1993

[54] STARTING DEVICE AND CIRCUIT FOR STARTING SINGLE PHASE MOTORS

[76] Inventor: Fritz H. Schroeder, P.O. Box 440098, Houston, Tex. 77244-0098

[21] Appl. No.: 973,635

[22] Filed: Nov. 9, 1992

Related U.S. Application Data

[63] Continuation-in-part of Ser. No. 401,223, Aug. 31, 1989, Pat. No. 5,162,718.

[51] Int. Cl.⁵ ............................................. H02P 1/44
[52] U.S. Cl. .................................... 318/794; 318/785; 318/781; 318/795
[58] Field of Search ............... 318/727, 728, 729, 778, 318/784–795, 810–811

[56] References Cited

U.S. PATENT DOCUMENTS

| | | | |
|---|---|---|---|
| 1,707,423 | 4/1929 | Bailey | 318/795 |
| 1,707,424 | 4/1929 | Bailey | 318/795 |
| 1,944,090 | 1/1934 | Lukens | 318/795 |
| 2,057,175 | 10/1936 | Werner | 318/795 |
| 2,057,214 | 10/1936 | Sleeter et al. | 318/795 |
| 2,181,734 | 11/1939 | Mooney | 318/795 |
| 2,280,971 | 4/1942 | Packer | 318/795 |
| 2,782,351 | 2/1957 | Suhr | 318/785 X |
| 3,020,464 | 2/1962 | Gerteis | 318/795 |
| 3,454,858 | 7/1969 | Robinson | 318/221 |
| 3,521,138 | 7/1970 | Enemark et al. | 318/221 |
| 3,538,409 | 11/1970 | Enemark | 318/220 |
| 4,012,678 | 3/1977 | Blaha | 318/794 |
| 4,063,135 | 12/1977 | Wanlass | 318/795 |
| 4,095,149 | 6/1978 | Wanlass | 318/795 X |
| 4,107,583 | 8/1978 | Houtman | 318/781 |
| 4,109,288 | 8/1978 | Berenson | 318/782 X |
| 4,451,775 | 5/1984 | Philips et al. | 318/795 X |
| 4,658,196 | 4/1987 | Hildebrandt | 318/793 |
| 4,734,601 | 3/1988 | Lewus | 318/785 X |
| 4,772,814 | 9/1988 | Lewus | 318/785 X |
| 4,853,569 | 8/1989 | Lewus | 318/795 X |

FOREIGN PATENT DOCUMENTS

| | | | |
|---|---|---|---|
| 0041479 | 4/1981 | Japan | 318/794 |
| 0022390 | 2/1982 | Japan | 318/794 |
| 0234479 | 11/1985 | Japan | 318/794 |

Primary Examiner—Paul Ip
Attorney, Agent, or Firm—Kenneth A. Roddy

[57] ABSTRACT

An auxiliary capacitance starting device is connected by only two wires to a permanent split capacitor motor. The device includes an auxiliary start capacitor and a control relay which has a set of normally closed contacts, a coil, and a resistor. The auxiliary start capacitor and the normally closed contacts are connected in series and the coil and resistor are connected in series and in parallel with the auxiliary start capacitor and contacts. The free ends of two non-polarized wire leads are interchangeably electrically connected to the start and run windings or the run capacitor of the motor to place the circuit in parallel with the start and run windings or the run capacitor such that the relay coil means becomes energized upon detection of voltage representing full motor speed to open the contacts and break the electrical connection between the auxiliary start capacitor and the start and run windings. The relay coil becomes de-energized upon detection of no voltage to close the contacts to allow the immediate re-application of electrical power to the common and run terminals of the motor. The components and circuitry are enclosed in a housing which may be mounted on a suitable surface in close proximity to the motor.

14 Claims, 2 Drawing Sheets

STARTING DEVICE AND CIRCUIT FOR STARTING SINGLE PHASE MOTORS

CROSS REFERENCE TO RELATED APPLICATION

This application is a continuation-in-part of copending U.S. application Ser. No. 07/401,223 now U.S. Pat. No. 5,162,718.

BACKGROUND OF THE INVENTION

1. Field of the Invention

This invention relates generally to apparatus and circuits for starting single phase motors, and more particularly to a starting device and circuit for starting single phase motors utilizing auxiliary capacitance provided by a pre-assembled universal add-on start kit connected across the start and run winding of an induction motor or in parallel with the run capacitor of a permanent split capacitor motor with only two interchangeable non-polarized wires.

2. Brief Description of the Prior Art

Definitions

In order to more clearly understand the differences between the present invention and the prior art, a brief definition of the terminology used herein will follow.

There are 3 basic types of RELAYS used in circuitry in the field of air conditioning motors;

(1) a CONTROL RELAY or GENERAL PURPOSE SWITCHING RELAY is energized by continuous voltage and the energy coil is normally rated at 24 volts, 110/120 volts, or 208/240 volts.

(2) a CURRENT RELAY is activated by the amount of current (amperage) that passes through a winding. They are usually rated at ⅛ H.P., ¼ HP,—to 1 H.P., etc.

(3) a POTENTIAL MOTOR START RELAY is energized by voltage and has the added specification of pickup and dropout voltages in addition to the continuous voltage coil rating. There are approximately 15 potential motor starting relays, and each with a different continuous, pickup and dropout voltage.

"Current" relays, "control" relays, and "potential motor start" relays cannot be exchanged with each other because the associated circuitry is unique to each relay.

There are 2 basic types of CAPACITORS used in the field of air conditioning motors;

(1) an OPERATING or RUN CAPACITOR does not exceed 55 MFD and 440 volts in specifications and is rated for continuous operation.

(2) a START CAPACITOR does not exceed 1200 MFD and 330 volts in specifications and is rated for intermittent operation only.

An auxiliary capacitor can mean two entirely different things. It is either an auxiliary "OPERATING or RUN" capacitor used in continuous operation and/or to assist other "operating or run" capacitors, or, it is an auxiliary "START" capacitor used intermittently to assist the motor in starting.

"OPERATING" or "RUN CAPACITORS" and "START CAPACITORS" cannot be exchanged with each other because their circuitry is designed for either continuous or intermittent operation and they have different voltage capacities. If an auxiliary start capacitor were to stay connected for more than 3 seconds, it would become permanently damaged.

Single phase motors are commonly classified as split phase motors, permanent split capacitor motors, capacitor start-capacitor run motors and capacitor start-induction run motors. Most single phase induction motors require some type of switching arrangement for starting the motor, usually by switching start windings, a start capacitor, a run capacitor or a combination thereof until the motor reaches full speed. Capacitor start motors require a start capacitor only during the starting period of the motor. In the 1920's when induction closed contacts open and disconnect the auxiliary capacitor from the circuit. The potential relay remains energized until the power to the motor is disconnected. Once the power is disconnected, the circuit returns to the power-off state and the motor can be restarted immediately.

One of the major problems with the above described circuitry is that it requires three electrically conducting wires, one connected to the common terminal, one to the run terminal, and one to the start terminal of the motor. These wire connections are polarized, which means that each wire must be connected to a dedicated terminal and the wire connections can not be interchanged. Serious damage and injuries often occur because the wires have been connected incorrectly. This problem occurs so often that some air conditioning manufacturers have factory installed a plug for receiving auxiliary capacitance devices to prevent damage to their equipment caused by field service personnel incorrectly connecting the wires.

Another problem with this method is that the threshold voltages across the start windings vary greatly for different motor manufacturers and different motor sizes, and a variety of potential relays with different coil voltage energizing ratings must be used within a power voltage range (110 volts, 230 volts, etc). The potential motor starting relays are special relays and cannot be used for any other purpose than potential motor starting relays. For example, approximately ten different potential relays, each with a different coil voltage rating are available for 230 volt PSC motors alone. This means that a motors first appeared for commercial use, it was learned that the running or operating motor would be more efficient if a "run capacitor" is permanently connected across the start and run terminals of the motor. This type of motor is now called a "PSC motor" or "Permanent Split Capacitor motor".

Under normal usage conditions, the "Permanent Split Capacitor" motor will start easily. These types of motors are used as compressor drive motors for air conditioning and refrigeration. An air conditioner compressor has to work harder as the temperature increases, and in these conditions, the motor may have a problem starting due to the load placed on it by the compressor or due to old or worn equipment. In order to overcome the "hard start" problem, field technicians will sometimes rig-up an external assortment of components between the common, start, and run terminals of the motor.

It is often necessary to add auxiliary capacitance to the run capacitor used in conjunction with a permanent split capacitor motor (PSC motor) during the starting phase of the motor so as to maintain the power factor as near to one as possible in order to achieve maximum power input and therefore apply maximum torque to the rotor of the PSC motor until the rotor reaches full speed. This starting phase usually lasts less than one second and the auxiliary capacitor must be disengaged from the circuit near or at the time the rotor reaches full speed.

Several auxiliary starting devices have been utilized to add auxiliary capacitance to the run capacitor of these type of motors. These auxiliary starting devices are commonly referred to as "Hard-Start Kit", "Start Assist" or "Motor Torque Multiplier".

One common auxiliary starting device utilizes an auxiliary capacitor in series with a solid state material which rapidly increases in resistance as it is heated when an electric current passes through it, thereby effectively disconnecting the auxiliary capacitor from the circuit soon after power is applied to the motor. However, one of the major problems with this method is that the solid state material remains hot from the "trickle current" that continues to pass through it as long as power is applied to the motor. Once the power has been disconnected from the motor, the solid state material begins to cool which requires approximately one to two minutes. If power is re-applied during the cooling off period, the auxiliary capacitor is ineffective because it is still de-energized.

Another auxiliary starting device utilizes an auxiliary capacitor electrically connected with two wires in parallel to the run capacitor through a normally closed set of contacts of an electromechanical relay commonly known as a potential relay. The coil of the relay is connected in parallel with the start winding of a permanent split capacitor (PSC) motor. As power is applied to the motor, the voltage across the start winding rises and when that voltage reaches a threshold near full speed of the rotor of the motor, the potential relay energizes, the normally service technician must always have available a costly large inventory of a very wide range of relay and capacitor combinations.

Thus, with the prior art auxiliary start methods, the service technician must determine the threshold voltage of the motor, select the appropriate potential relay from an array of approximately eleven or more differently rated potential relays, and select the appropriate corresponding start capacitor from an array of approximately sixty-eight or more differently rated start capacitors. He or she must then individually mount and interconnect the potential relay and start capacitor according to a prescribed wiring diagram. Each wire of each component is polarized, that is each wire must be connected to a dedicated terminal or connection, and these wires cannot be interchanged. Serious damage or injury often occurs due to the wires being connected incorrectly. In addition to being dangerous, this rigging-up of individual external components requires the field technician to carry a large inventory of components of all sizes and ratings, and spend a great portion of their time completing the component matching and installation and wiring operations.

The present invention utilizes the feature that the voltage rise across the start and run terminals of "Capacitor Start" and "Permanent Split Capacitor" motors is constant and provides a single unitary device which has only two wires extending out of a compact housing. These wires are interchangeable (i.e. either wire can be attached to either the run or start terminal of a compressor motor). The present invention does not use a potential motor start relay, but rather utilizes a control relay in combination with a resistor in a circuit which functions as a potential relay. Thus, one unit eliminates the need for a large inventory of a wide assortment potential relays and start capacitors, does not require field assembly, and can be installed by making only two simple connections.

There are several patents which disclose various apparatus and methods of starting single phase motors.

Blaha, U.S. Pat. No. 4,012,678 discloses a wiring arrangement to minimize contact welding of a potential relay employed in a starting circuit. It does so by switching resistors and capacitors in series with the windings of an induction motor.

Robinson, U.S. Pat. No. 3,454,858 discloses a "hotwire" thermal starting relay used in conjunction with a specially designed capacitor for fractional horse power motors.

Enemark et al., U.S. Pat. No. 3,521,138 discloses a thermally responsive bimetal starting mechanism for single phase motors. As pointed out above, thermally responsive devices, whether they are hot wire, bimetal, use a thermistor or ceramic material can not be restarted immediately once the power has been removed, because the aforementioned materials must cool to ambient temperatures before they become operative.

Enemark, U.S. Pat. No. 3,538,409 discloses a specially designed capacitor which when heated from current passing through it changes capacitance and therefore changes from a higher torque to a low torque starting system.

Hildebrandt, U.S. Pat. No. 4,658,196 discloses mechanical governor switches connected to the shaft of a motor which de-energizes and disconnects a start capacitor from the circuit when the motor shaft reaches full speed.

Woyski, U.S. Pat. No. 4,651,077 discloses a total solid state (sparkless) start switch for de-energizing a start capacitor of a single phase AC motor as the motor approaches full speed. The switch has no moving parts such as a current relay or potential relay and the control parameters sense phase differences between main winding and start winding voltages to disengage at selected motor speeds.

Pottebaum, U.S. Pat. No. 4,958,118 discloses a solid state (sparkless) wide-range control circuit for controlling the motor speed of a single phase AC motor, especially when starting from a stopped position. The circuit has no moving parts such as a current relay or potential relay and the circuit controls the motor speed by sensing actual motor rotation by induction from the motor rotor, which in turn modulates the voltage applied to the motor windings which then controls the motor speed.

Min, U.S. Pat. No. 5,041,771 discloses a total solid state (sparkless) starting circuit for starting a single phase AC motor. The circuit has no moving parts such as a current relay or potential relay and eliminates the use of a start capacitor. The circuit supplies the start winding of the induction motor with pulse-width modulated signals which diminish to zero as the motor reaches full speed.

Japanese Patent 56-41479 to Seshimo is not a starting circuit, but rather an improved motor for driving compressors which will operate more efficiently during changes in outside temperature to save electricity. The Seshimo compressor drive motor comprises a main coil, auxiliary coil, main "operating or run" capacitor, auxiliary "operating or run" capacitor, relay, thermostat, relay contact point, and a general purpose switching relay coil. When the temperature of the external air is high, the main operating capacitor and the auxiliary operating capacitor are both used, but in operation under normal external air conditions the compressor is run with only the main "operating" capacitor, so that electrical power is conserved.

Houtman, U.S. Pat. No. 4,107,583 is directed toward special motor winding arrangements where windings and capacitors are switched in and out of the circuit depending upon current (amperage) through the special windings. The purpose of Houtman is to improve starting torque for a capacitor run motor without the necessity of any auxiliary external starting aid. Houtman utilizes a current switching relay which opens its contacts at a desired main winding current condition corresponding to a predetermined motor speed. The Houtman motor will start as a split phase motor and will thereafter operate continuously as a low resistance capacitor run motor.

The present invention is distinguished over the prior art in general, and these patents in particular by an auxiliary capacitance starting device which is connected by only two wires to a permanent split capacitor motor. The device includes an auxiliary start capacitor and a control relay which has a set of normally closed contacts, a coil, and a resistor. The auxiliary start capacitor and the normally closed contacts are connected in series and the coil and resistor are connected in series and in parallel with the auxiliary capacitor and contacts. The free ends of two non-polarized wire leads are interchangeably electrically connected to the start and run windings or the run capacitor of the motor to place the circuit in parallel with the start and run windings or the run capacitor such that the relay coil means becomes energized upon detection of voltage representing full motor speed to open the contacts and break the electrical connection between the auxiliary start capacitor and the start and run windings. The relay coil becomes de-energized upon detection of no voltage to close the contacts to allow the immediate re-application of electrical power to the common and run terminals of the motor. The components and circuitry are enclosed in a housing which may be mounted on a suitable surface in close proximity to the motor.

SUMMARY OF THE INVENTION

It is therefore an object of the present invention to provide a starting device and circuit utilizing auxiliary capacitance for starting single phase induction motors requiring high torque starting loads which eliminates serious damage and injuries to equipment and personnel caused by incorrect wiring connections by field technicians.

It is another object of this invention to provide a starting device and circuit utilizing auxiliary capacitance which requires no field assembly, and is easily and safely installed by field technicians and reduces the time and cost of installation and the possibility of wire connection errors.

Another object of this invention to provide a pre-assembled, universal add-on auxiliary capacitance device and circuit which is easily, quickly, and safely connected across the start and run winding of an induction motor or in parallel with the run capacitor of a permanent split capacitor motor at the run capacitor.

Another object of this invention is to provide a pre-assembled, universal add-on auxiliary capacitance device which requires only two non-polarized wires for its connection.

Another object of this invention is to provide a single unit, universal add-on auxiliary capacitance apparatus device which eliminates the need to carry and choose from an assortment of ten or more combinations of components requiring field assembly and hazardous three wire polarized connections.

Another object of this invention is to provide a pre-assembled, universal add-on auxiliary capacitance device and circuit which does not require specially designed components and may be used on fractional and integral horse power motors.

A further object of this invention is to provide a pre-assembled, universal add-on auxiliary capacitance device and circuit which utilizes a control relay, resistor, and capacitor combination which may be used for a range of power voltages, does not require cooling, and allows immediate restart of the motor.

A still further object of this invention is to provide a unitary, universal add-on auxiliary capacitance device which is simple in construction, economical to manufacture, and rugged, and reliable in operation.

Other objects of the invention will become apparent from time to time throughout the specification and claims as hereinafter related.

The above noted objects and other objects of the invention are accomplished by an auxiliary capacitance starting device which is connected by only two wires to a permanent split capacitor motor. The device includes an auxiliary start capacitor and a control relay which has a set of normally closed contacts, a coil, and a resistor. The auxiliary start capacitor and the normally closed contacts are connected in series and the coil and resistor are connected in series and in parallel with the auxiliary start capacitor and contacts. The free ends of two non-polarized wire leads are interchangeably electrically connected to the start and run windings or the run capacitor of the motor to place the circuit in parallel with the start and run windings or the run capacitor such that the relay coil becomes energized upon detection of voltage representing full motor speed to open the contacts and break the electrical connection between the auxiliary start capacitor and the start and run windings. The relay coil becomes de-energized upon detection of no voltage to close the contacts to allow the immediate re-application of electrical power to the common and run terminals of the motor. The components and circuitry are enclosed in a housing which may be mounted on a suitable surface in close proximity to the motor.

DESCRIPTION OF THE PREFERRED EMBODIMENT

Referring to the drawings by numerals of reference, the present invention is best explained by a comparison with the prior art.

Figure 1:
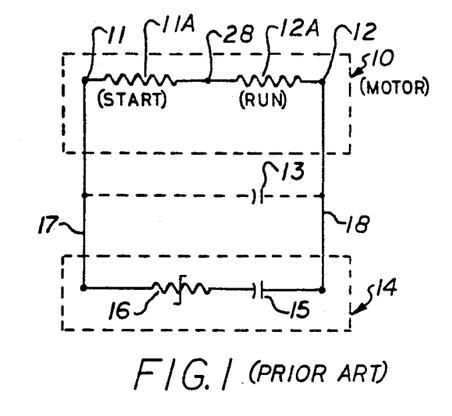
FIG. 1 is a schematic electrical diagram of a prior art auxiliary capacitance circuit for starting motors utilizing a capacitor and a solid state material.

One common prior art method of providing auxiliary capacitance to single phase induction motors is shown in FIG. 1. The motor 10 represented in dotted line has a start terminal 11, a run terminal 12, and a common terminal 28. In the case of permanent split capacitor motors, a run capacitor 13 is connected permanently across the start and run terminals 11 and 12 of the motor. The prior art auxiliary starting apparatus 14 represented in dotted line comprises an auxiliary capacitor 15 connected in series with a solid state material 16. The auxiliary apparatus 14 is connected with two electrically conducting wires 17 and 18 to the start terminal 11 and run terminal 12 of the motor 10, or in parallel with the run capacitor 13 of a permanent split capacitor motor.

The solid state material 16 rapidly increases in resistance as it is heated when an electric current passes through it, and effectively disconnects the auxiliary capacitor 15 from the circuit soon after power is applied to the start and run terminals 11 and 12 of motor 10. The solid state material 16 remains hot from the "trickle current" that continues to pass through it as long as power is applied to motor 10. Once the power has been disconnected from motor 10, the solid state material 16 begins to cool which requires approximately one to two minutes. If power is re-applied during the cooling off period, the auxiliary capacitor 15 is ineffective because it is still de-energized.

Figure 2:
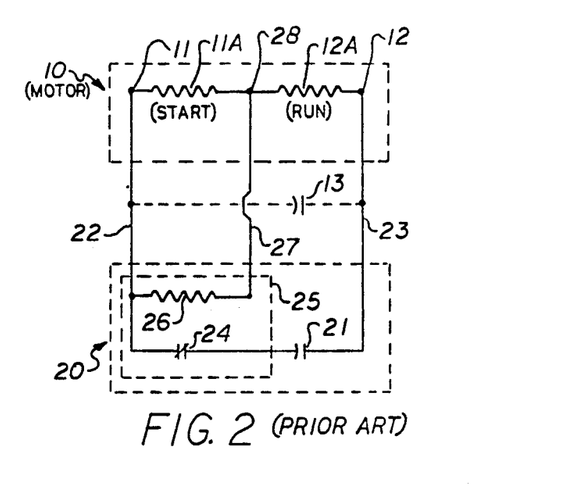
FIG. 2 is a schematic electrical diagram of another prior art auxiliary capacitance circuit for starting motors utilizing an electromechanical relay and requiring a three wire polarized connection for its installation.

Another common prior art method of providing auxiliary capacitance to single phase motors is shown in FIG. 2. As previously described, the motor 10 represented in dotted line has a start terminal 11, a run terminal 12, and a common terminal 28. In the case of permanent split capacitor motors, a run capacitor 13 is connected permanently across the start and run terminals 11 and 12 of the motor. The auxiliary starting apparatus 20 represented in dotted line comprises an auxiliary capacitor 21 connected by wires 22 and 23 in parallel to the run capacitor 13 through a normally closed set of contacts 24 of an electromechanical relay 25 commonly known as a potential relay. The coil 26 of relay 25 is electrically connected with wires 22 and 27 in parallel with the start winding 11A of a permanent split capacitor motor 10.

As power is applied to the motor 10 at common terminal 28 and run terminal 12, the voltage across the start winding 11A rises and when that voltage reaches a threshold near full speed of the rotor of the motor 10, potential relay 25 energizes and contacts 24 open to disconnect the auxiliary capacitor 21 from the circuit. The potential relay 25 remains energized until the power to the motor 10 is disconnected. Once the power is disconnected, the circuit returns to the power-off state and the motor can be restarted immediately. The apparatus of FIG. 2 requires three electrically conducting wires, 27, 22 and 23 connected to the common 28, start and run 12 terminals, respectively, of the motor 10. These wire connections are polarized, that is each wire must be connected to a dedicated terminal and the wire connections can not be interchanged. The threshold voltages across start winding 11A varies greatly for different motor manufacturers and different motor sizes. A variety of potential relays with different coil voltage energizing ratings must be used within a power voltage range, that is 110 volts, 230 volts etc. Approximately ten different potential relays, each with a different coil voltage rating are available for 230 volt PSC motors alone.

The three wire connection of FIG. 2 often results in serious damage and injuries due to the wires being connected incorrectly. Also, since the threshold voltages across start winding 11A varies greatly for different motor manufacturers and different motor sizes, field service personnel must carry an inventory of a very wide range of relay and capacitor combinations, and spend a large portion of their service time completing the component matching and wiring operations.

Figure 3:
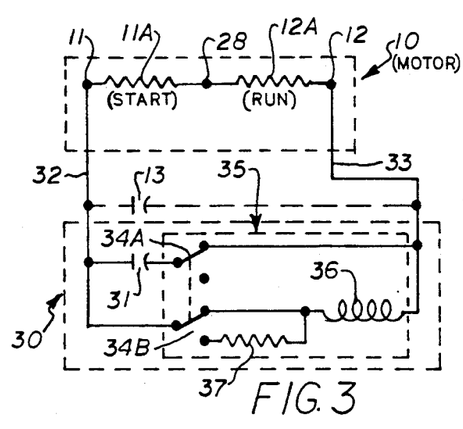
FIG. 3 is a schematic electrical diagram of the auxiliary capacitance circuit for starting motors in accordance with the present invention utilizing a control relay and associated circuitry to operate as a potential relay and requiring only a two wire non-polarized connection for its installation.

Referring now to FIG. 3 of the drawings, the auxiliary capacitance start circuit of the present invention is illustrated. As described above with reference to FIG. 2, the motor 10 represented in dotted line has a start terminal 11, a run terminal 12, and common terminal 28. In the case of permanent split capacitor motors, a run capacitor 13 is connected permanently across the start and run terminals 11 and 12 of the motor. The present auxiliary capacitance starting apparatus 30 represented in dotted line comprises an auxiliary motor start capacitor 31 connected, at the power off state, by wires 32 and 33 in parallel to the run capacitor 13 or the start and run terminals 11 and 12 through a normally closed set of first contacts 34A of a DPDT control relay 35, to assist the motor in starting. The coil 36 of the control relay 35 is parallel connected to the wires 32 and 33 through one terminal of the second set of contacts 34B. A resistor 37 is series connected between the coil 36 and the other terminal of the second set of contacts 34B. The wires 32 and 33 are not dedicated and may be interchangeably connected to the start and run terminals or to the run capacitor. At the power off state, the auxiliary motor start capacitor 31 is ready to assist the motor in starting.

At start-up, power is applied to the run winding 12A of motor 10 at common terminal 28 and run terminal 12, and the voltage begins to rise between start winding terminal 11 and run winding terminal 12. That same voltage is applied across the coil 36 of the control relay 35 through the normally closed relay contacts 34A. When this voltage reaches the pick-up voltage threshold of the relay (at ar near full speed of the motor 10), the relay contacts 34A open and disengage the auxiliary motor start capacitor 31 which is no longer needed. Simultaneously, the control relay contacts 34B switch to complete the circuit through resistor 37 and the voltage from the start terminal 11 and run terminal 12 is now applied to the coil 36 through resistor 37. The resistance and wattage rating of resistor 37 is critical and must be sized corresponding to the coil characteristics of the control relay s as to drop the voltage in such a manner as not to exceed the voltage rating of the coil 36 when the voltage across the start and run terminals 11 and 12 has reached its operating level (run level). When the power is disconnected from motor 10, the circuit returns immediately to the power-off state and can be recycled (restarted) instantly.

Figure 4:
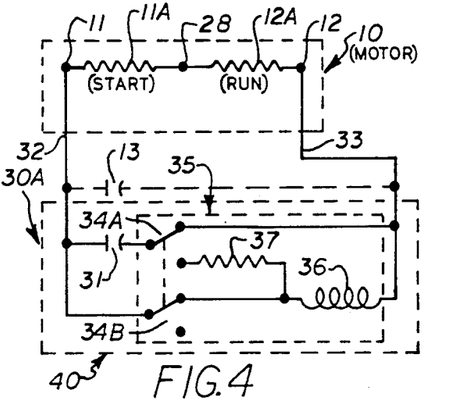
FIG. 4 is a schematic electrical diagram of a modification of the auxiliary capacitance start circuit utilizing a control relay and associated circuitry wherein the location of the resistor is changed to keep maintain the start capacitor in the circuit to assist the run capacitor in starting the motor and to become part of the voltage dropping circuit to condition the voltage for the relay coil.

FIG. 4 shows a modification of the auxiliary capacitance starting circuit 30A wherein the location of the resistor 37 is changed to connect the motor start capacitor 31 in series with the resistor 37 and relay coil 36. In this embodiment, the motor start capacitor 31 does not disconnect entirely from the circuit, but rather serves two functions; (a) to assist the run capacitor 13 in starting the motor, and (b) to become part of the voltage dropping circuit along with resistor 37 to condition the voltage for relay coil 36.

As described above, the motor 11 represented in dotted line has a start terminal 11, a run terminal 12, and common terminal 28. In the case of permanent split capacitor motors, a run capacitor 13 is connected permanently across the start and run terminals 11 and 12 of the motor. The auxiliary capacitance starting apparatus 40 represented in dotted line comprises an auxiliary motor start capacitor 31 connected, at the power off state, by wires 32 and 33 in parallel to the run capacitor 13 or the start and run terminals 11 and 12 through one terminal of a normally closed set of first contacts 34A of a DPDT control relay 35, to assist the motor in starting. The coil 36 of the control relay 35 is parallel connected to the wires 32 and 33 through one terminal of the second set of contacts 34B. A resistor 37 is series connected between the coil 36 and the other terminal of the first set of contacts 34A. The wires 32 and 33 are not dedicated and may be interchangeably connected to the start and run terminals or to the run capacitor. At the power off state, the auxiliary motor start capacitor 31 is ready to assist the motor in starting.

At start-up, power is applied to the run winding 12A of motor 10 at common terminal 28 and run terminal 12, and the voltage begins to rise between start winding terminal 11 and run winding terminal 12. That same voltage is applied across the coil 36 of the control relay 35 through the second set of relay contacts 34B. When this voltage reaches the pick-up voltage threshold of the relay (at ar near full speed of the motor 10), the relay contacts 34B open and simultaneously the relay contacts 34A switch to complete the circuit between the auxiliary motor start capacitor 31 and coil 36 through resistor 37. The voltage from the start terminal 11 and run terminal 12 is now applied to the start capacitor 31, resistor 37, and coil 36. Thus, the series connected coil 36, resistor 37, and start capacitor 31 are connected in parallel with the run capacitor 13 or the start and run terminals 11 and 12 of the motor 10.

In this position, the auxiliary motor start capacitor 31 is not allowed to store a charge after the motor has started because that charge is constantly bled off through resistor 37 and coil 36. In other words, the auxiliary motor start capacitor 31 becomes part of the voltage dropping circuit along with resistor 37 to condition the voltage for relay coil 36. Bleeding off the charge on the start capacitor 31 saves "wear and tear" on the normally closed contacts 34A when power is removed from the start and run terminals 11 and 12. The resistance and wattage rating of resistor 37 must be sized corresponding to the coil characteristics of the control relay so as to drop the voltage in such a manner as not to exceed the voltage rating of the coil 36 when the voltage across the start and run terminals 11 and 12 has reached its operating level (run level). When the power is disconnected from motor 10, the circuit returns immediately to the power-off state and can be recycled (restarted) instantly.

Figure 5:
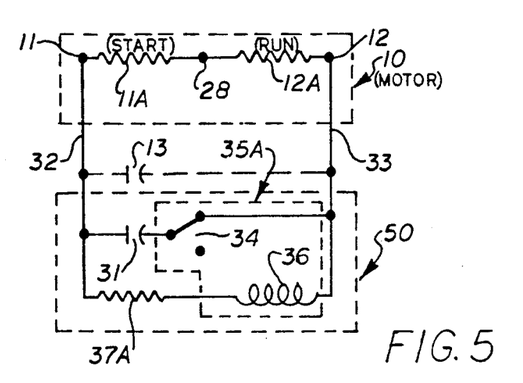
FIG. 5 is a schematic electrical diagram of another modification of the auxiliary capacitance start circuit utilizing a control relay and a single pole relay and a voltage dropping resistor.

FIG. 5 shows another modification of the auxiliary capacitance starting circuit 50 wherein the DPDT relay and resistor 37 is replaced by a SPST relay 35A having one set of contacts 34 and a series connected voltage dropping resistor 37A.

As previously described, the motor 10 represented in dotted line has a start terminal 11, a run terminal 12, and common terminal 28. In the case of permanent split capacitor motors, a run capacitor 13 is connected permanently across the start and run terminals 11 and 12 of the motor. The auxiliary capacitance starting apparatus 50 represented in dotted line comprises an auxiliary motor start capacitor 31 connected, at the power off state, by wires 32 and 33 in parallel to the run capacitor 13 or the start and run terminals 11 and 12 through a normally closed set of contacts 34 of a SPST control relay 35A, to assist the motor in starting. A series connected voltage dropping resistor 37A and the coil 36 of the control relay 35A are connected in parallel with the auxiliary start capacitor 31 by the wires 32 and 33. The wires 32 and 33 are not dedicated and may be interchangeably connected to the start and run terminals 11 and 12 Or to the run capacitor 13. At the power off state, the auxiliary motor start capacitor 31 is ready to assist the motor in starting.

At start-up, power is applied to the run winding 12A of motor 10 at common terminal 28 and run terminal 12, and the voltage begins to rise between start winding terminal 11 and run winding terminal 12. That same voltage is applied across the resistor 37A and coil 36 and across auxiliary motor start capacitor 31 through the normally closed relay contacts 34. when this voltage reaches the pick-up voltage threshold of the relay (at ar near full speed of the motor 10), the relay contacts 34 open and disengage the auxiliary motor start capacitor 31 which is no longer needed. The coil 36 and resistor 37A remain in the circuit and the voltage from the start terminal 11 and run terminal 12 is now applied to the coil 36 through resistor 37A. The resistance and wattage rating of resistor 37A is critical and must be sized corresponding to the coil characteristics such that the voltage drop across resistor 37A energizes relay coil 36 when it reaches its pick-up voltage (usually 60% to 80% of its continuous voltage rating) and yet have sufficient voltage drop so as not to exceed the voltage rating of the coil 36 when the voltage across the start and run terminals 11 and 12 has reached its operating level (run level). When the power is disconnected from motor 10, the circuit returns immediately to the power-off state and can be recycled (restarted) instantly.

Figure 6:
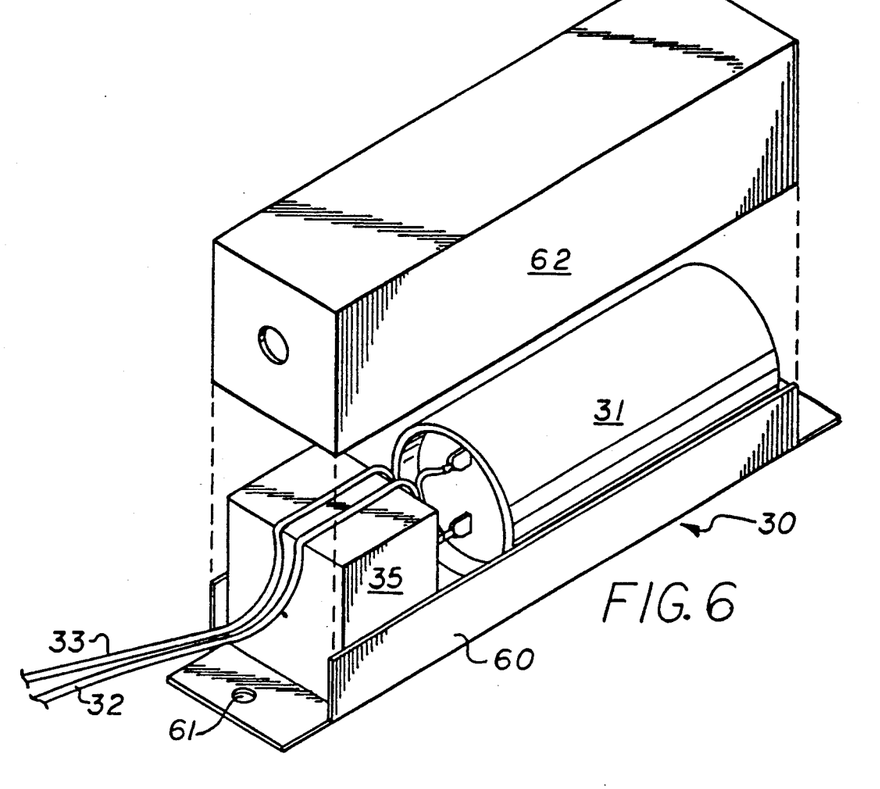
FIG. 6 is an isometric view of the auxiliary capacitance apparatus in accordance with the present invention.

As shown in FIG. 6, the auxiliary motor start capacitor 31 and control relay 35 components of the auxiliary starting apparatus 31 are pre-wired and mounted within a rectangular base member 60. The components are connected as described above with the wire leads 32 and 33 extending outwardly from the relay connections. The base member 60 has a mounting hole 61 near at least one end to receive a sheet metal screw for mounting the base to a suitable surface adjacent the run capacitor of the motor. A box-like cover 62 is secured over the base member 60 to enclose the components with only the two wires 32 and 33 extending outwardly therefrom. The cover and base are secured together by conventional means, such as a snap fit, soldering, or epoxy. It should be understood, that the components, after being wired together may be alternatively encased in a potting material to form a unitary starting module with only two wires extending outwardly therefrom.

Thus, the present auxiliary starting apparatus may be easily mounted, such as on the frame or housing of an air conditioning or refrigeration compressor unit, and the two non-polarized wires quickly and safely connected to the start and run terminals of the motor, or in parallel with the run capacitor of a permanent split capacitor motor. The wire connections are not dedicated and may be interchanged. Since the threshold voltage developed across the run and start terminals of these motors is relatively unvarying for different motor manufacturers and motor sizes, one control relay may be used for a particular power voltage range. The present invention eliminates having to choose from an assortment of combinations of components and the costly, time consuming field assembly and hazardous task of connecting the components with three polarized wires.

The present auxiliary capacitance start apparatus also utilizes a control relay in combination with an auxiliary motor start capacitor in several circuits which serves the function of a potential motor start relay but eliminates the need for a service technician to carry a large inventory of potential relays and capacitors.

While this invention has been described fully and completely with special emphasis upon a preferred embodiment, it should be understood that within the scope of the appended claims the invention may be practiced otherwise than as specifically described herein.

I claim:

1. An auxiliary starting circuit adapted to be connected by only two interchangeable wires to a permanent split capacitor motor having a start winding and a run winding, the auxiliary starting circuit comprising;
   an auxiliary start capacitor and normally closed contacts electrically connected in series,
   said auxiliary start capacitor and said normally closed contacts adapted to be placed electrically in parallel with the existing start and run windings when the motor is started,
   a control relay coil and a resistor electrically connected in series and said series connected control relay coil and said resistor electrically connected in parallel with said auxiliary start capacitor and said normally closed contacts for sensing a voltage rise in the start and run windings of the motor, whereby
   said control relay coil becomes energized upon detection of voltage representing full motor speed to open said normally closed contacts and disconnect the electrical connection between said auxiliary start capacitor and the start and run windings of the motor, and
   said control relay coil becomes de-energized upon detection of no voltage to close said normally closed contacts and reconnect said auxiliary start capacitor to allow the immediate re-application of electrical power to the common and run terminals of the motor for starting the motor through the auxiliary start circuit.

2. The auxiliary starting circuit according to claim 1 wherein
   said series connected auxiliary start capacitor and normally closed contacts and said series connected control relay coil and resistor are adapted to be electrically connected in parallel between the start terminal and run terminal of the motor.

3. The auxiliary starting circuit according to claim 1 wherein
   said permanent split capacitor motor includes a run capacitor electrically connected in parallel with the start and run windings of the motor, and
   said series connected auxiliary start capacitor and normally closed contacts and said series connected control relay coil and resistor are adapted to be electrically connected in parallel with the run capacitor of the motor.

4. The auxiliary starting circuit according to claim 1 wherein
   said control relay is a double pole double throw relay having a first and second set of contacts,
   said auxiliary start capacitor is adapted to be placed electrically in parallel with the existing start and run windings through one terminal of said first set of contacts to assist the motor in starting,
   said control relay coil is electrically connected in parallel with said auxiliary start capacitor through one terminal of said second set of contacts, and
   said resistor is electrically connected in series between said control relay coil and another terminal of said second set of contacts, whereby
   said control relay coil becomes energized upon detection of voltage representing full motor speed to open said first set of contacts and disconnect the electrical connection between said auxiliary start capacitor and the start and run windings of the motor, and
   simultaneously switch said second set of contacts to complete a circuit through said resistor such that the voltage from the start and run windings is applied to said control relay coil through said resistor, and
   said control relay coil becomes de-energized upon detection of no voltage to close said first set of contacts and reconnect said auxiliary start capacitor in parallel and simultaneously switch said second set of contacts to reconnect said control relay coil and disconnect said resistor to allow the immediate re-application of electrical power to the common and run terminals of the motor for starting the motor through the auxiliary start circuit.

5. The auxiliary starting circuit according to claim 1 wherein
   said control relay is a double pole double throw relay having a first and second set of contacts,
   said auxiliary start capacitor is adapted to be placed electrically in parallel with the existing start and run windings through one terminal of said first set of contacts to assist the motor in starting,
   said control relay coil is electrically connected in parallel with said auxiliary start capacitor through one terminal of said second set of contacts, and
   said resistor is electrically connected in series between said control relay coil and another terminal of said first set of contacts, whereby
   said control relay coil becomes energized upon detection of voltage representing full motor speed to open said second set of contacts and simultaneously switch said first set of contacts to connect said auxiliary start capacitor, said resistor, and said control relay coil in series with one another and in parallel with the start and run windings of the motor such that the voltage from the start and run windings is applied to said auxiliary start capacitor, and said control relay coil through said resistor, whereby said start capacitor remains in the circuit and functions to assist the run capacitor in starting the motor, and to become part of the voltage dropping circuit along with said resistor to condition the voltage for said control relay coil, and said control relay coil becomes de-energized upon detection of no voltage to close said second set of contacts and reconnect control relay coil in parallel and simultaneously switch said first set of contacts to disconnect said resistor and reconnect said auxiliary start capacitor in parallel to allow the immediate re-application of electrical power to the common and run terminals of the motor for starting the motor through the auxiliary start circuit.

6. The auxiliary starting circuit according to claim 1 wherein said control relay is a single pole single throw relay having a set of contacts, and said resistor is a voltage dropping resistor having a resistance and wattage rating corresponding to the characteristics of said control relay coil such that the voltage drop across said resistor will energize said control relay coil when it reaches its pick-up voltage threshold and still have sufficient voltage drop so as not to exceed the voltage rating of said control relay coil when the voltage across the start and run windings has reached its running level.

7. A method for starting a permanent split capacitor motor having a start winding and a run winding through an auxiliary starting circuit comprising the steps of;

electrically connecting an auxiliary start capacitor and the normally closed contacts of a control relay in series, electrically connecting the coil of said control relay in series with a resistor and connecting said series connected coil and resistor in parallel with said series connected auxiliary start capacitor and normally closed contacts for sensing voltage, electrically connecting said series connected auxiliary start capacitor and normally closed contacts said series connected control relay coil and resistor in parallel with the start and run windings of the motor, and applying electrical power to the common and run terminals of the motor, whereby said control relay coil means becomes energized upon detection of voltage representing full motor speed to open said normally closed contacts and disconnect the electrical connection between said auxiliary start capacitor and the start and run windings, and said control relay coil becomes de-energized upon detection of no voltage to close said normally closed contacts and reconnect said auxiliary start capacitor to allow the immediate re-application of electrical power to the common and run terminals of the motor for starting the motor through the auxiliary start circuit.

8. The starting method according to claim 6 wherein said control relay coil and one terminal of said normally closed contacts each have a single wire extending therefrom, and said step of electrically connecting said series connected auxiliary start capacitor and normally closed relay contacts and said series connected control relay coil and resistor in parallel with the start and run windings of the motor comprises connecting either of the wires to the start terminal of the motor and the other wire to the run terminal of the motor.

9. The starting method according to claim 6 wherein said control relay coil and one terminal of said normally closed contacts each have a single wire extending therefrom, said permanent split capacitor motor includes a run capacitor electrically connected in parallel with the start and run windings of the motor, and said step of electrically connecting said series connected auxiliary start capacitor and normally closed relay contacts and said series connected control relay coil and resistor in parallel with the start and run windings of the motor comprises connecting either of the wires to one terminal of the run capacitor and the other wire to another terminal of the run capacitor of the motor.

10. An auxiliary starting device adapted to be connected by only two interchangeable wires to a permanent split capacitor motor having a start winding and a run winding, the device comprising;

an auxiliary start capacitor and relay means including a set of normally closed contacts, a control relay coil, and a resistor, said auxiliary start capacitor and said normally closed contacts electrically connected in series with one another, said control relay coil and said resistor electrically connected in series with one another and connected in parallel with said series connected auxiliary start capacitor and said normally closed contacts, one element of said normally closed contacts being connected to a first terminal, said auxiliary start capacitor being connected in series between another element of said normally closed contacts and a second terminal, and said series connected control relay coil and resistor being connected between said first terminal and said second terminal and coupled with said normally closed contacts to open said contacts upon a predetermined voltage representing full motor speed, a first non-polarized wire lead having one end connected to said first terminal and a second non-polarized wire lead having one end connected to said second terminal, and the free ends of said non-polarized wire leads adapted to be interchangeably electrically connected in parallel with the start and run windings of the motor, whereby said control relay coil becomes energized upon detection of voltage representing full motor speed to open said normally closed contacts and disconnect the electrical connection between said auxiliary start capacitor and the start and run windings, and said control relay coil becomes de-energized upon detection of no voltage to close said normally closed contacts and reconnect said auxiliary start capacitor to allow the immediate re-application of electrical power to the common and start terminals of the motor for starting the motor through the auxiliary start circuit.

11. The auxiliary starting device according to claim 10 wherein the free ends of said first and second wire leads are adapted to be interchangeably electrically connected in parallel to the start terminal and run terminal of the motor.

12. The auxiliary starting device according to claim 10 wherein
the permanent split capacitor motor includes a run capacitor electrically connected in parallel with the start and run windings of the motor, and
the free ends of said first and second wire leads are adapted to be interchangeably electrically connected in parallel with the run capacitor of the motor.

13. The auxiliary starting device according to claim 10 wherein
said auxiliary start capacitor and said control relay coil are interconnected such that said auxiliary start capacitor and said normally closed relay contacts are connected in series and said control relay coil and said resistor are connected in parallel therewith, and
said interconnected auxiliary start capacitor and control relay are mounted within a single housing with said first and second wire leads extending outwardly therefrom.

14. The auxiliary starting device according to claim 13 wherein
said single housing is provided with mounting means for mounting said housing to a suitable surface in close proximity to the motor.

* * * * *